US008084126B2

(12) United States Patent
Steele et al.

(10) Patent No.: US 8,084,126 B2
(45) Date of Patent: Dec. 27, 2011

(54) THERMOSET RESIN FIBRES

(75) Inventors: Mark Raymond Steele, Belper (GB);
Andrew Gibbs, Tibshelf (GB); Amy Grace Atkinson, Sherwood (GB)

(73) Assignee: Advanced Composites Group Limited, Derbyshire (GB)

( * ) Notice: Subject to any disclaimer, the term of this patent is extended or adjusted under 35 U.S.C. 154(b) by 0 days.

(21) Appl. No.: 12/669,115

(22) PCT Filed: Jul. 10, 2008

(86) PCT No.: PCT/GB2008/002378
§ 371 (c)(1),
(2), (4) Date: Mar. 9, 2010

(87) PCT Pub. No.: WO2009/013458
PCT Pub. Date: Jan. 29, 2009

(65) Prior Publication Data
US 2010/0203787 A1    Aug. 12, 2010

(30) Foreign Application Priority Data
Jul. 20, 2007   (GB) .................................. 0714224.3

(51) Int. Cl.
*D02G 3/00* (2006.01)
*D03D 15/00* (2006.01)
(52) U.S. Cl. ........ 428/364; 428/369; 428/370; 428/373; 428/377; 442/181; 442/239
(58) Field of Classification Search .................. 428/364, 428/369, 370, 373, 377; 442/181, 239; 57/200, 57/207, 210, 238
See application file for complete search history.

(56) References Cited

U.S. PATENT DOCUMENTS

| | | | |
|---|---|---|---|
| 3,628,995 A | 12/1971 | Eggertsville et al. | |
| 3,979,493 A | 9/1976 | Cameron et al. | |
| 4,021,410 A | 5/1977 | Koyama et al. | |
| 5,130,193 A * | 7/1992 | Ikeda | 428/365 |
| 6,261,414 B1 | 7/2001 | Kato et al. | |
| 2001/0049421 A1 | 12/2001 | Burlone et al. | |
| 2007/0100071 A1 | 5/2007 | Bonnet et al. | |
| 2008/0081170 A1 * | 4/2008 | Tilbrook et al. | 428/292.1 |
| 2010/0263781 A1 * | 10/2010 | Yamaguchi | 152/556 |

FOREIGN PATENT DOCUMENTS
EP      1400342 A2    3/2004
(Continued)

OTHER PUBLICATIONS

International Search Report for PCT/GB2008/002378, Mailing date of International Search Report Jul. 13, 2009.
(Continued)

*Primary Examiner* — Norca L Torres Velazquez
(74) *Attorney, Agent, or Firm* — Pearne & Gordon LLP

(57) ABSTRACT

The present invention relates to thermoset resin fiber components, composite materials including thermoset resin fiber components, composite articles manufactured using such composite materials and methodologies for manufacturing same. The thermoset resin fiber components may include a single fiber of thermoset resin or a plurality of fibers commingled together. The properties and characteristics of the thermoset resin used are chosen according to the material to be produced therefrom. The thermoset fiber components may be woven into reinforcement fibers to form prepregs. Thermoplastic fibers may be commingled and co-woven with the thermoset fiber components.

36 Claims, 10 Drawing Sheets

FOREIGN PATENT DOCUMENTS

| | | | |
|---|---|---|---|
| GB | 2077880 | A | 12/1981 |
| JP | 63154745 | A | 12/1986 |
| JP | 62-084151 | | 4/1987 |
| JP | 08066922 | A | 8/1994 |
| JP | 08-174688 | | 7/1996 |

OTHER PUBLICATIONS

Written Opinion of the International Searching Authority.
Search Report Dated Oct. 13, 2008 for corresponding British Application No. GB0714224.3.

* cited by examiner

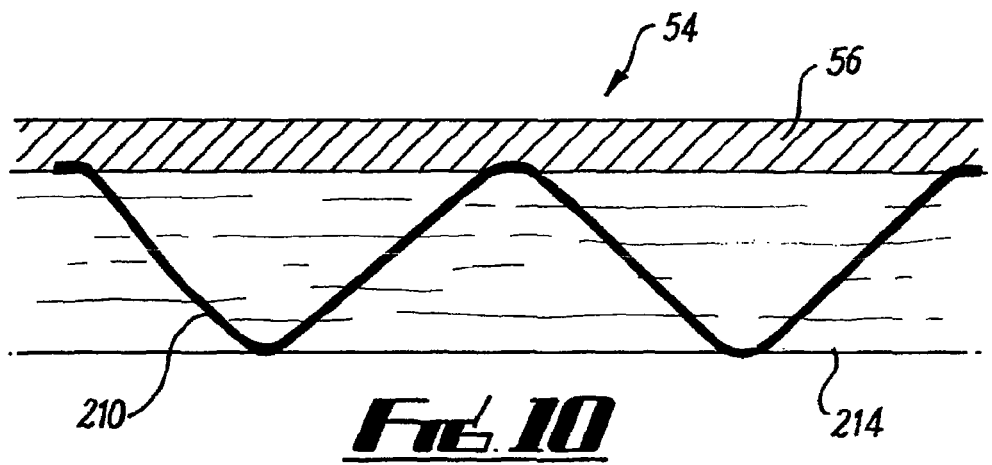
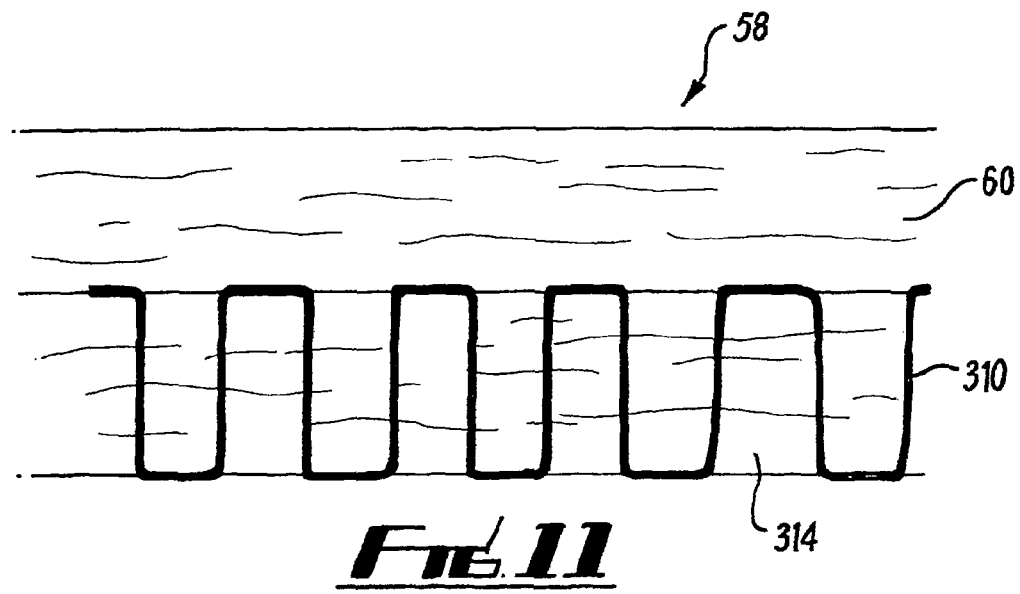
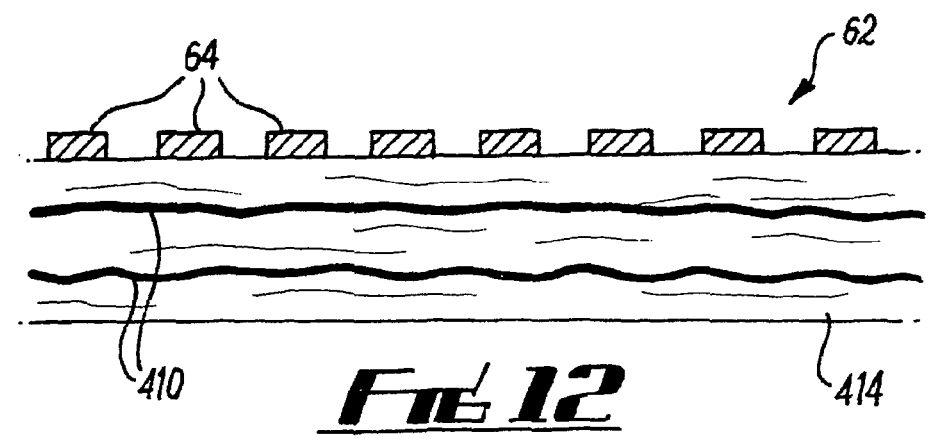

THERMOSET RESIN FIBRES

BACKGROUND OF THE INVENTION

1. Field of Invention

The present invention relates to thermoset resin fibres, particularly but not exclusively to thermoset resin fibres for use in the manufacture of fibre reinforced composite materials and composite articles.

2. Description of Related Art

Fibre reinforced composites generally comprise reinforcing fibres in a curable resin matrix. The reinforcing fibres are insoluble within the resin matrix, generally acting to stiffen and strengthen and thus reinforce the resin matrix particularly once cured. Suitable such reinforcing fibres include carbon, glass, aramid, ceramic and others known to those skilled in the art.

The combined physical and chemical properties of the matrix resin and the reinforcing fibres in composite materials are generally such that when the combination is cured, the resultant composite articles have considerable strength and relatively light weight characteristics which enable such components to find many applications in many industries, including the aerospace, automotive, marine and civil engineering industries. The resin(s) and fibre(s) are carefully chosen to produce a composite material and composite article with desired characteristics, as is well known to those skilled in the art.

There are many known methodologies for forming fibre reinforced composite materials and articles made from fibre reinforced composite materials. There are methods that involve the combination of matrix resin with reinforcing fibres prior to placement on a tool or in a mould for cure to form composite articles. Prepregs are pre-selected combinations of reinforcing fibre and matrix resin generally presented in the form of sheets or tapes. The advantages and disadvantages of known prepreg conformations are known to those skilled in the art.

Other methods for the manufacture of fibre reinforced composites include placement of dry reinforcing fibres into a tool or mold and then infusing resin into the fibres using technologies such as Resin Transfer Moulding and Liquid Resin Infusion. Again the advantages and disadvantages of such resin infusion technologies are known to those skilled in the art.

Generally, the matrix resin comprises a thermoset resin, such as an epoxy resin, cyanate ester, BMIs or combinations thereof. In the manufacture of prepregs, the thermoset resins are generally introduced to a layer of reinforcing fibres to either fully impregnate or partially impregnate the layer, according to known techniques. The matrix resin can be introduced to the reinforcing fibre layer in either liquid form to either form a layer of resin on the fibre, to partially impregnate or fully impregnate the fibre layer, or it can be introduced as a preformed layer of resin placed on the surface of the fibre layer. In such prepregs, the matrix resin generally comprises thermoset resin and cure agents to facilitate cure of the thermoset. As a consequence, the shelf-life of such prepregs is limited, often with freezing or refrigeration storage required to prolong shelf-life to a practicable level.

In the resin infusion technologies, the matrix resin is generally introduced in liquid form to fully impregnate the dry fibre layers during cure. Again, the thermoset resin is generally introduced along with cure agents which often in combination with conditions of elevated temperature and/or pressure result in the cure of the thermoset resin within the reinforcing fibre structure and thus the formation of a composite component or article having a fibre reinforced resin matrix.

With such known technologies for the production of fibre reinforced composite articles it is the general aim to prevent or minimise the formation of undesirable air pockets or voids within the cured fibre reinforced composite article as these present weaknesses within the finished article. When uncured prepregs are placed in a mould or tool to form an article, it can be desirable for a number to be stacked on top of one another. Often air gets trapped between the layers and various technologies exist that assist in the removal of these air pockets during the cure process. However, these can involve complex and expensive processes and apparatus, such as autoclaves to produce the necessary conditions to drive the air out from between the resinous layers.

Other forms of composite material do not contain fibre reinforcement. For example, resinous adhesives often comprise a combination of liquid thermoset resin with other constituents such as cure agents, catalysts, hardeners etc. To avoid premature cure of such materials the thermoset and the curatives are often kept separate until the adhesive is needed. However, this can be inconvenient, and it can be advantageous for the thermoset and the curatives to be provided together in accurately predetermined amounts, but this generally results in relatively short shelf-life.

BRIEF SUMMARY OF THE INVENTION

According to the present invention there is provided a curable thermoset resin fibre component for use in the manufacture of composite material.

The thermoset resin fibre component may comprise a plurality of thermoset resin fibres. The fibres within the thermoset resin fibre component may be continuous and/or discontinuous, unidirectional, twisted and/or intertwined.

The thermoset resin fibre component preferably comprises one or more of an epoxy resin, cyanate ester resin, BMI (bismaleimide), polybenzoxazine, polyimide, phenolic resin and polyester. The fibres in the fibre component may comprise a blend of a number of thermoset resins and/or the component may comprise a plurality of different fibres comprising different thermoset resins and/or blends thereof.

The thermoset resin fibre component may comprise additives, such as one or more thermoplastics that may act to toughen the thermoset fibre component particularly when cured. The additives may be dissolved within the thermoset resin fibre component. Preferably the thermoset resin fibre component comprises little or no cure agent. This will endow the thermoset resin fibre component with a relatively long shelf-life. Alternatively, the thermoset fibre component may comprise cure agent, but the cure agent is preferably restricted from promoting cure under storage conditions, for example the cure agent may be inhibited at relatively low temperatures and thus inhibited when the component is stored under refrigerated or frozen conditions.

Preferably the thermoset resin fibre component is generally non tacky, and readily manually handleable. Preferably the thermoset has a viscosity greater than $5 \times 10^4$ Pas, more preferably, greater than $2 \times 10^5$ Pas, at a temperature of 23° C. Preferably the viscosity drops to below $2 \times 10^3$ Pas during cure.

Preferably the fibre component has a diameter of between 3 and 50 microns and most preferably between 5 and 10 microns.

Preferably the component has a shelf-life of over 12 months when stored frozen and preferably has a shelf-life of between 3 and 12 months if stored at ambient temperatures (between 18° C. and 23° C.).

Preferably the curable thermoset resin fibre component comprises N, N,N,N-tetraglycidil-4'4-diaminodiphenylmethane and polyethersulphone. Preferably the polyethersulphone is dissolved within the N,N,N,N-tetraglycidyl-4'4-diaminodiphenylmethane.

Preferably the thermoset resin fibre component comprises part of a resin system according to a further aspect of the present invention, which system further comprises a cure agent to facilitate cure of the thermoset resin fibre component.

The cure agent may be introduced to the thermoset resin fibre component at or just before the onset of cure, perhaps using technology similar to resin infusion. This way the composite material is stable in that it will not appreciably cure in the absence of the requisite cure agent(s), thus enjoying a relatively long shelf-life.

Alternatively or in addition the cure agent may be associated with the thermoset resin fibre component, but in a form where cure of the thermoset resin is not promoted. For instance the cure agent may be solid, such as in particulate or fibre farm, or in other highly viscous form, to reduce contact and interaction with the thermoset resin fibre such that curative interaction between them is relatively slow or substantially avoided under suitable storage conditions such as refrigeration and freezing.

The cure agent may comprise one or more of catalyst, hardener. Examples of suitable cure agents include dicyanimide, 4,4'-diaminodiphenylsulphone, 3,3'-diaminodiphenylsulphone, 4,4'-methylenebis (2,6'-diethylaniline), 4,4'-methylenebis (2-isopropyl-6-methylaniline), 3,5'-diethyetoluene-2,4/2,6-diamine, N,N'-(methyl-1,3-phenylene) bis[N,N'-dimethylurea], 1-(2-cyanoethyl)-2-ethyl-4-methylimidazole.

According to a further aspect of the present invention there is provided a composite material comprising a curable thermoset resin fibre component and a reinforcing fibre component.

The thermoset resin fibre component may comprise a plurality of thermoset resin fibres and may be as described in any of the preceding thirteen paragraphs. Preferably the outside diameters of the respective fibre components are substantially the same, preferably between 5 and 7 micron for carbon reinforcing fibre components and 15 to 20 micron for glass reinforcing fibre components.

The reinforcing fibre component may comprise one or more of carbon, glass, aramid, ceramic. The ratio of thermoset resin fibre component to reinforcing resin fibre component is in the range 50:50 to 10:90 v/v.

The thermoset resin fibre component may comprise part of a resin system, which system according to the present invention comprises a composite material as described in the preceding three paragraphs and a cure agent. Preferably the thermoset resin fibre component is away from contact with the cure agent until it is desired that the curable thermoset resin fibre is cured. The cure agent is preferably a liquid at processing temperatures.

Alternatively or in addition the cure agent may be a solid, such as a fibre or a particulate, in which case there may be contact between some or all of the thermoset resin fibres and the cure agent, but their physical nature and/or the storage conditions are such that the curative interaction between them is relatively slow or substantially prevented.

The resin system may further comprise other additives, such as thermoplastic.

The fibre or some or all of the reinforcing fibres in the reinforcing fibre component may be woven, stitched, continuous or discontinuous, unidirectionally of randomly orientated, chopped, twisted, intertwined or indeed in any suitable conformation for the production of composite articles.

The thermoset resin fibre component and the reinforcing fibre component may be commingled, such as by being woven, stitched, twisted and/or intertwined together. One or more thermoset resin fibres may be twisted around and along the length of one or more reinforcing fibres and/or visa versa. Alternatively or in addition the thermoset resin fibre component and the reinforcing fibre component may run alongside each other in generally parallel configuration.

Alternatively or in addition the composite material may comprise a layer of thermoset resin fibres and a layer of reinforcing fibres contacted on at least one respective surface. Each layer of fibres may be woven, stitched, continuous or discontinuous, unidirectional or randomly configured, and may be in the form of a sheet, textile or mat.

The thermoset resin component may be woven, stitched, or otherwise threaded into the reinforcing fibre component, either to be generally evenly distributed within, and possibly throughout the reinforcing component, or at one or more predetermined and selected regions of the reinforcing fibre component.

Alternatively, or in addition, the reinforcing fibre component may be woven, stitched or otherwise threaded into the thermoset resin fibre component, either to be generally evenly distributed within and preferably throughout the thermoset resin fibre component or at one or more predetermined and selected regions within the thermoset resin fibre component.

According to a further aspect invention there is provided a composite material comprising a curable thermoset resin fibre component and a further non-reinforcing fibre component.

The thermoset resin fibre component is preferably as described above.

The non-reinforcing fibre component may comprise a thermoplastic fibre component, which in turn may comprise a plurality of thermoplastic fibres.

The thermoplastic fibre component may comprise one or more of a thermoplastic polymer such as polyethylene, polypropylene, polyamide, polyether-ether-ketone, polyethylene terephthalate, polyethersulphone, polyetherimide, polyarylsulphone, polyphenylene sulphide, polyimide, polysiloxane and various types of rubbers. The or at least some of the thermoplastic fibres may be semi-crystalline.

Preferably the thermoplastic fibre component acts to toughen the composite material particularly when cured.

Preferably the ratio of thermoset resin fibre to non-reinforcing fibre component is in the range 90/10 to 70/30, and most preferably 80/20 v/v.

Alternatively or in addition, the non-reinforcing fibre component may comprise cure agent, such as one or more of those described herein.

The thermoset resin fibre component and the non-reinforcing fibre component may be commingled together to form the composite material as described in any of the paragraphs above.

Preferably the composite material comprises part of a resin system which may further comprise cure agent or further cure agent to facilitate cure of the thermoset resin component. The cure agent may be as described above.

The invention therefore further provides a resin system as described in the preceding paragraph.

According to a further aspect to the present invention there is provided a composite material comprising a thermoset resin fibre component, a further non-reinforcing fibre component and a reinforcing fibre component.

Preferably the thermoset resin fibre component is as described above. Preferably the non-reinforcing fibre component is as described above.

Preferably the reinforcing fibre component is as described above.

Preferably the fibre components are commingled, such as by weaving, twisting, stitching, intertwining, threading or any other suitable way, and may together, form a sheet, tape or other preform. The respective fibre components in the material may be substantially uniformly distributed within and desirably throughout the composite material. Alternatively or in addition the location and amount of the respective fibre components may be selected and predetermined to provide materials and cured articles made therefrom with desired characteristics, such as regions of relatively high resin toughness, region of relatively high and/or low Vf.

Two of the three types of fibres may be commingled together in one way, for example twisted together, and then those two commingled with the third type of fibre either in the same way or alternatively in a different way, such as woven, threaded, stitched.

The composite materials may comprise all the resin needed to sufficiently wet-out the reinforcing fibre component during cure. However, in certain embodiments thermoset resin, including non-fibrous thermoset resin may be provided in or added to the composite materials and/or further resin may be introduced to the material during cure, such as by resin infusion technology, or may be provided as a further component of the material, such as a layer of resin or discrete amounts of resin at spaced areas on a surface of the material.

The non-reinforcing fibre component may be spaced from the thermoset resin fibre component by the reinforcing resin fibre component, thus preventing contact between the non-reinforcing fibre component and the thermoset resin fibre component. This may be particularly useful where the non-reinforcing component comprises cure agent.

According to a still further aspect to the present invention there is provided a method of manufacturing a composite article, the method comprising subjecting a curable thermoset resin fibre component to cure conditions to fully or partially cure the component.

According to a further aspect to the present invention there is provided a method of manufacturing a composite article comprising subjecting a composite material as described above to cure conditions.

The thermoset resin fibre component or composite material may be combined with cure agent at or shortly before commencement of the cure process, in which case the cure agent is preferably introduced to the resin fibre component as a liquid, and preferably directly to the mould or tool on which the fibre component or composite material has been placed for moulding and cure. The fibre component or composite material may be in the form of a preform.

Alternatively, or in addition, the cure agent may be introduced to the resin fibre component or composite material as a solid, such as a particulate or fibre.

Alternatively or in addition the cure agent may be comprised within the composite material and the cure action thereof promoted by the application of the cure conditions.

According to a further aspect of the present invention there is provided a composite article manufactured a curable thermoset resin fibre component and subjecting same to conditions to cure the thermoset resin fibre.

According to a further aspect of the present invention there is provided a composite article manufactured by subjecting a composite material, as described above, to conditions to cure the composite material.

The conditions may comprise the introduction of cure agent to the thermoset resin fibre component and/or composite material, and may include impregnating the composite material with cure agent.

BRIEF DESCRIPTION OF DRAWINGS

Embodiments of the present invention will now be described by way of example only, with reference to the accompanying drawings, in which:—

FIG. 1b is a diagrammatic cross-section of the thermoset resin fibre component of FIG. 1a;

FIG. 10 is a diagrammatic lengthwise cross-section of a composite material according to a further embodiment of the present invention;

FIG. 11 is a diagrammatic lengthwise cross-section of a composite material according to a still further embodiment of the present invention;

FIG. 12 is a diagrammatic lengthwise cross-section of a composite material according to another embodiment of the present invention;

DETAILED DESCRITPION OF THE INVENTION

Figure 1A:
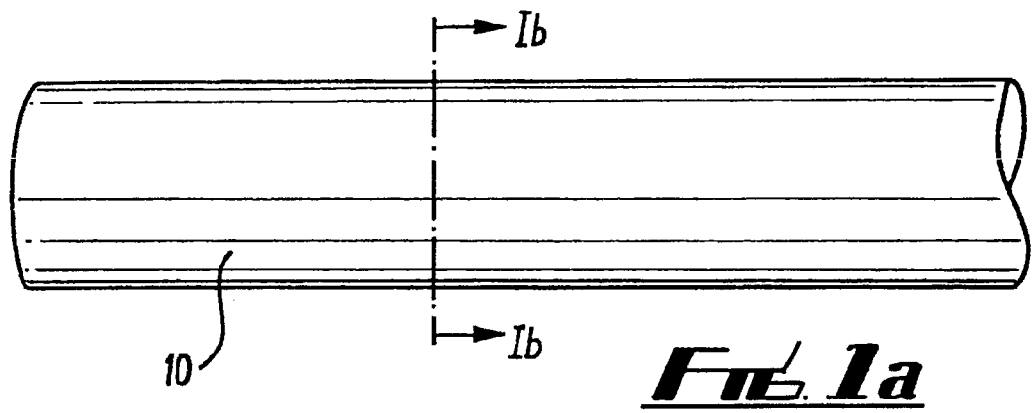
FIG. 1a is a diagrammatic representation of a thermoset resin fibre component according to the present invention.
Figure 1B:
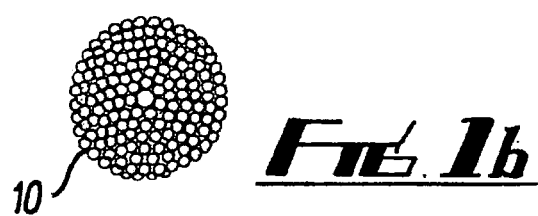
Figure 1C:
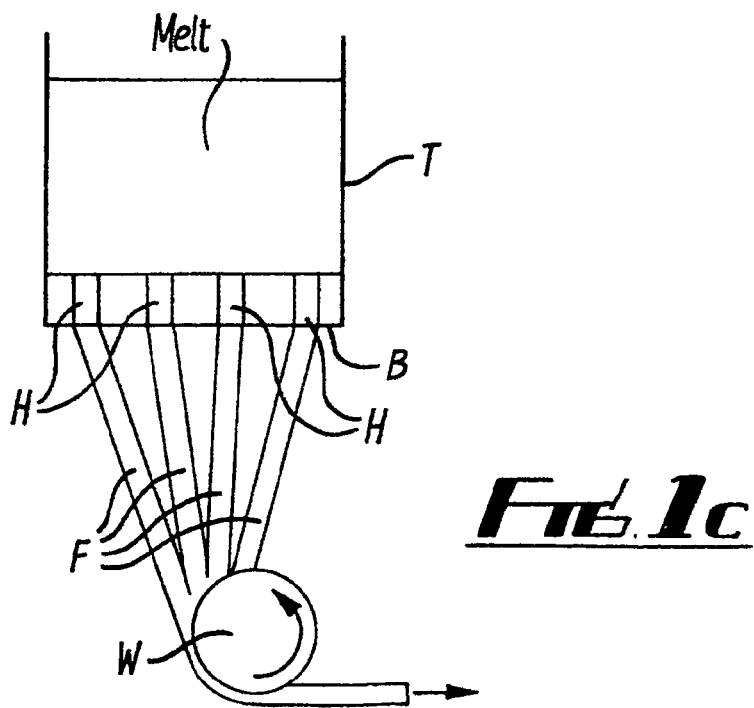
FIG. 1c is a diagrammatic representation of apparatus suitable for the production of the thermoset resin fibres of the present invention.

On page 16, line 4, please replace the paragraph with the following:

FIG. 1c shows a simple method of producing thermoset resin fibre components 10 in accordance with the present invention. Liquid thermoset resin (melt) is discharged through a die or spinneret comprised of openings H in the base B of the holding tank T. Pressure may be applied to drive the resin through the die. As the resin fibres F emerge from the base of the tank, they are generally cooled to solidify them prior to collection on a take up wheel W.

The present invention relates to thermoset resin fibre components, composite materials comprising thermoset resin fibres and composite articles manufactured using such composite materials and methodologies for manufacturing same.

FIG. 1 is a diagrammatic representation of a part of a curable thermoset fibre resin component 10 for use in the manufacture of a composite material.

The thermoset fibre component 10 is elongate. The dimensions of the fibre component 10 can be engineered to be suitable for the manufacture of a desired composite material but generally they would have diameters within the range of 1 micron to 50 micron. The thermoset resin fibre component 10 may comprise a single fibre of thermoset resin. Alternatively, the fibre component 10 could comprise a plurality of fibres commingled together to form a thread or yarn.

FIG. 1b illustrates a cross-section of such a fibre component in the direction Ib. The fibres may be commingled by twisting them together for instance, or by any other suitable method to form a fibre thread or yarn. The properties and characteristics of the thermoset resin used are chosen according to the materials to be produced therefrom. The or one or more of the fibres within the thermoset fibre component may be a blend of thermoset resins. Alternatively, or in addition different fibres within the thermoset resin fibre component may comprise different resin(s), so that for example a component may comprise two different types of fibres each made up of one or a blend of resins to have a combination that differs from the other in the resins that make up the blend. So for example, one type of fibre could comprise epoxy resin and another could comprise cyanate ester resin. In a still further alternative, the thermoset fibre component may comprise two or more types of fibres that differ in their respective compositions in that they each comprise a blend of the same resins but the resins within the blend are present in different amounts. For example one type of fibre may comprise a blend of epoxy resins and the other within the component a different blend of the same epoxy resins. The nature of any additives in the component may be the same or differ between the different types of fibre therein.

The present invention enables the person skilled in the art to formulate resin compositions and incorporate these in the form of fibres into a thermoset resin fibre component to create a curable composite material and articles made therefrom with desired physical and chemical characteristics.

Suitable thermoset resins include epoxy resins, cyanate ester resins, BMI's (bismaleimides), polybenzoxazine, polyimide, phenolic resin, polyesters and others known tip those skilled in the art.

The resin fibre component 10 may comprise additives, such as thermoplastic polymer that may be provided to enhance the toughness characteristics of the thermoset resin when cured. The type and amount of thermoplastic can differ between different types of fibres within the component.

In certain embodiments, the thermoset resin fibre component 10 comprises no cure agent. This ensures that the fibre component 10 is stable, thus giving the fibre 10 a relatively long storage or shelf-life.

It is however, within the scope of the present invention that some cure agent may be provided in the fibre component 10 but preferably in a form that does not promote cure of the thermoset resin until subjected to particular conditions to initiate or facilitate cure.

FIG. 1c shows a simple method of producing thermoset resin fibre components 10 in accordance with the present invention. Liquid thermoset resin (melt) is discharged through a die or spinneret comprised of openings H in the base B of the holding tank T. Pressure may be applied to drive the resin through the die. As the resin fibres F emerge from the base of the tank, they are generally cooled to solidify them prior to collection on a take up wheel T.

If the tank T is static then the thermoset resin fibres F will comprise a single fibre or strand of thermoset resin and each will correspond to a thermoset resin fibre component 10 of the present invention.

If the tank T rotates about a vertical axis, then as the fibres F emerge from the die they are twisted around each other. This twisted yarn or thermoset resin fibre component 10 is then collected on the take up wheel for onward processing.

The apparatus of FIG. 1c shows only four strands or fibres F of thermoset resin emerging therefrom. It will be appreciated however that the number of openings H may range from a single opening to thousands of openings.

This method of manufacture can produce thermoset fibre components of a single formulation when the tank T is charged with a single type of thermoset resin formulation.

However, the tank T may be subdivided into a number of discrete chambers, each of which can be charged with a different resin formulation. This enables thermoset resin fibre components 10 according to the present invention to be produced comprising a plurality of fibres having differing resin compositions and/or formulations.

Suitable curable thermoset resin fibre components have been manufactured using N,N,N,N-tetraglycidyl-4'4-diaminodiphenylmethane and polyethersulphone dissolved therein.

The thermoset resin fibre components are generally non-tacky to the touch and thus readily easily manually handleable. Thermoset resin components 10 generally have a viscosity greater than $5\times10^4$ Pas and more preferable greater than $2\times10^5$ Pas, at temperatures of about 23° C. During cure, the viscosity drops below $2\times10^3$ Pas facilitating impregnation, as will be discussed.

The thermoset resin fibre components generally have diameters of between 3 and 50 micron, most preferably between 5 and 10 micron. The size of the fibres can be engineered with reference to the diameter of each fibre produced and the number of fibres within a component 10.

Thermoset resins according to this formulation have a shelf life of over 12 months when stored frozen and between 3 and 12 months if stored at ambient temperatures (between 18° C. and 23° C.).

Thermoset resin fibres 10 according to the present invention will find 25, application in many technologies and industries and of particular interest is the use of such fibres 10 in the manufacture of curable composite materials and composite articles made therefrom.

Figure 2:
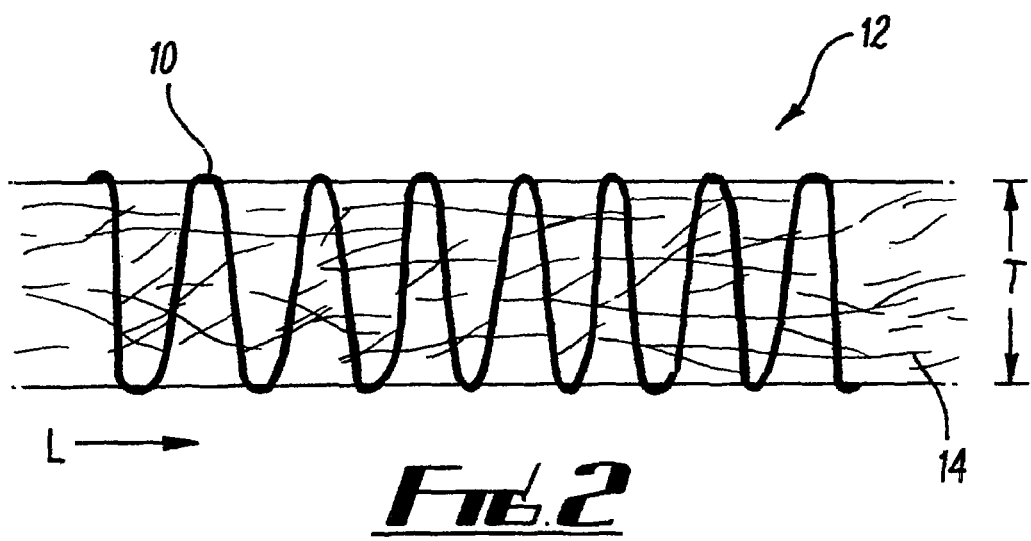
FIG. 2 is a diagrammatic lengthwise cross-section of a composite material comprising a thermoset resin fibre component and a reinforcing fibre component according to the present invention.

FIG. 2 is a diagrammatic cross-section of a curable composite material 12 comprising a curable thermoset resin fibre component 10 as described above woven into a reinforcement fibre component 14. In all of the figures the thermoset resin components are shown with exaggerated diameters. This is for clarity of illustration. It is generally preferred that the diameters of the thermoset resin components are the same or similar to those of other fibrous components within the composite material to facilitate fibre packing.

The reinforcing fibre component 14 may be of any known type, such as carbon, glass, aramid, ceramics or other materials known to those skilled in the art.

The reinforcing fibre component 14 may be woven, stitched, continuous, discontinuous, unidirectional, chopped, random mat or any other configuration of such materials known to those skilled in the art. The reinforcing fibre component of FIG. 2 is in the form of a layer.

Such composite materials 12 have a number of advantages.

Firstly, the thermoset resin fibre component 10 is stable, being generally resistant to premature cure due to the limited presence or inhibition of cure agent, which gives the composite material 12 good storage characteristics and relatively long shelf-life.

The threading of the fibre component 10 through the thickness (T) of the fibre layer 14 and along its length (direction indicated at L) ensures that there is good and generally even distribution of the thermoset resin component 10 throughout the fibre layer 14. This provides for uniform and swift impregnation of the thermoset resin within the fibre layer 14 during cure.

This ability to evenly distribute the fibre component 10 enables relatively small amounts of resin to be incorporated into the fibre layer 14 whilst still achieving sufficient impregnation and "wet-out" during cure, thus enabling composite materials to be produced with reinforcing fibre to thermoset resin ratios as high as 90:10 (90% vf) pre-cure, with the Vf dropping to between 55 and 65% Vf post-cure.

The fibrous form of the component 10 also provides for excellent air evacuation characteristics, as the fibres 10 do not significantly impair the movement and thus the removal of air during cure.

A further advantage is that the generally non-tacky thermoset fibres 10 provide the material 12 with good handling characteristics.

The composite material 12 can be considered a form of prepreg or preform and can be cut to shape and formed for placement in a mould or on a tool in accordance with conventional prepreg and preform moulding techniques.

In general to produce a cured composite article using the composite material 12 of FIG. 2, the material 12 is cured according to generally known techniques. Where insufficient or no cure agent is present in the component itself, the cure process requires the introduction of cure agent to the thermoset resin fibre component 10. Cure agents typically comprise hardeners and catalysts and are typically highly fluid having very low viscosity at processing temperatures. This enables the cure agent to rapidly impregnate fibre layer 14 and "wet out" the material 12. Air within the fibre layer 14 is driven out during impregnation of the cure agent, and also during cure as will be explained.

Figure 15:
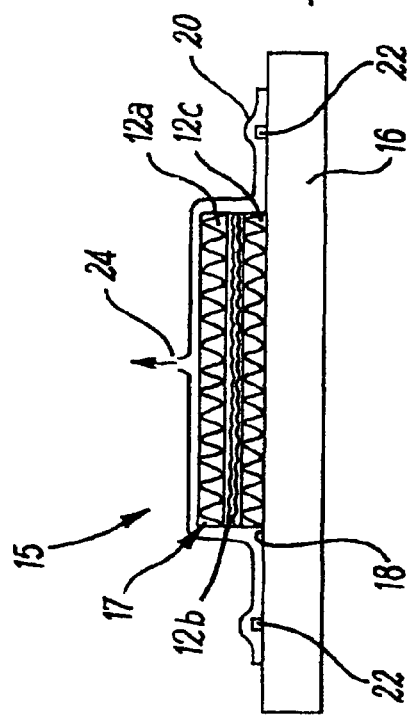
FIG. 15 is a diagrammatic representation of a multi-layered composite material or perform according to the present invention, located in mould apparatus for cure.

FIG. 15 is a diagrammatic representation of a simple mould apparatus 15 that can be used to manufacture composite articles from composite materials according to the present invention. The apparatus 15 comprises a mould or tool 16 having a tool surface 18 on which has been laid a stack 17 comprising three layers of composite material 12a, 12b, 12c. The lower and upper layers 12a, 12c comprise composite material 12 shown in FIG. 2 the middle layer 12b shows a composite material described in relation to FIG. 4a. It will be appreciated however that the nature, number and orientation of composite materials stacked can be varied and chosen by those skilled in the art according to the desired characteristics of the moulded article and generally in accordance with known techniques. Indeed, the stack can comprise layers of resin, dry fibre, veils, adhesives, cores, syntactic foams and any other suitable such materials and structures conventionally employed in the manufacture of cured composite articles The apparatus comprises a simple vacuum bag arrangement comprising an impermeable polymeric bag 20 sealed around the outside of the stack 17 by seals 22 in conventional manner.

Once the desired composite stack 17 has been formed and sealed generally beneath the membrane 20 a cure agent is introduced. This can be done using technologies akin to resin infusion technologies, such as Resin Transfer Moulding, Liquid Resin Infusion and others known to those skilled in the art.

As described above, the cure agents are introduced as a very low viscosity liquid and rapidly wet out the stack 17. The cure agents are usually heated prior to introduction to the composite material to reduce viscosity. The wetted out stack 17 is then subjected to suitable cure conditions, which can involve elevated temperatures and/or vacuum conditions. In FIG. 15, an outlet 24 is shown through which air is drawn from under the membrane 20, to facilitate the removal of air and prevent void formation.

It is found that composite articles formed using composite materials of the present invention have little to no voidage. The fibrous nature of the thermoset fibre components facilitates air evacuation. Air within the structure can be drawn out past the fibres before they begin to melt. As the temperature increases, the resin components melt to wet-out the reinforcing fibres. The ability to thoroughly and evenly distribute the thermoset fibre components throughout the fibrous reinforcement, whether in the form of layers or otherwise, helps to ensure uniform cure throughout the structure, generally preventing early stage cure in particular areas of the composite, and thus avoiding air entrapment which can occur in known arrangements where the resin is not uniformly distributed throughout the fibre reinforcement layer.

Figure 3:
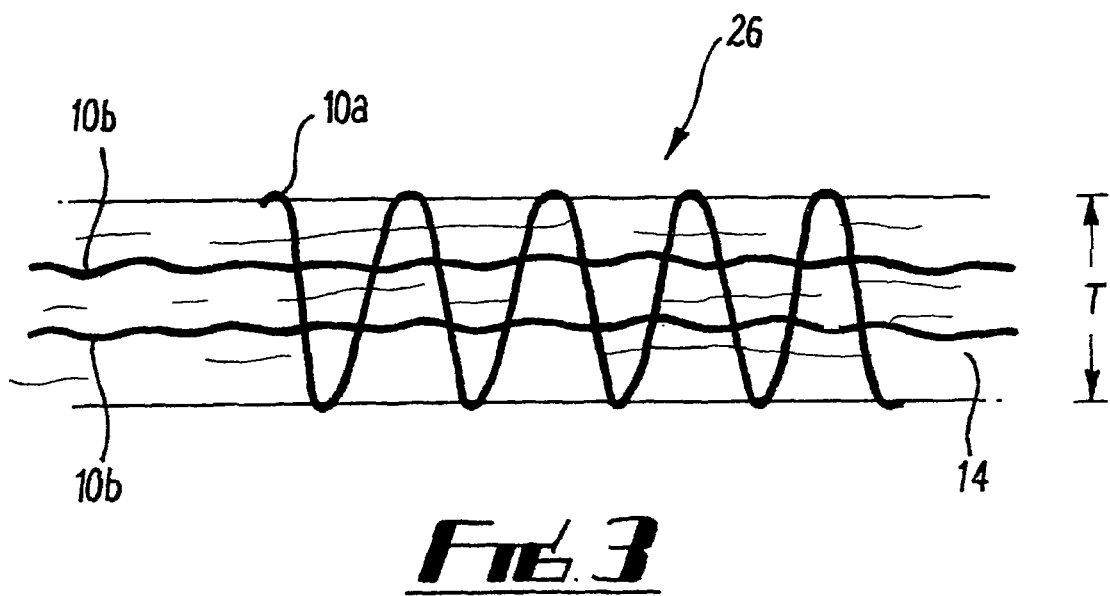
FIG. 3 is a diagrammatic lengthwise cross-section of a composite material comprising a thermoset resin fibre component and a reinforcing fibre component, according to an alternative embodiment of the present invention.

FIG. 3 is diagrammatic cross-sectional representation of a composite material 26 according to a further embodiment of the present invention. In this embodiment thermoset fibre component 10a, b is commingled with the reinforcing fibre component 14 in two ways. Fibre component 10a is woven or stitched through the thickness of the component 14, as in the embodiment described in relation to FIG. 2.

The fibre components 10b are threaded or woven within the reinforcing fibre component 14, along the length thereof, but without spanning the thickness T.

This arrangement can enable more thermoset resin to be distributed within the reinforcing fibre component 14, to facilitate uniform impregnation of the thermoset fibre during and after cure. Further, weaving or threading more than one fibre component 10 in the reinforcing fibre 14 enables different thermoset resins and other additives within each respective thermoset resin fibre component 10a, b to be incorporated into the material 26 when desired.

It will be appreciated that many combinations of thermoset resin fibre components can be commingled with the reinforcing fibre component 14 (and vice versa) to produce composite materials and articles made therefrom with desired properties.

Figure 4A:
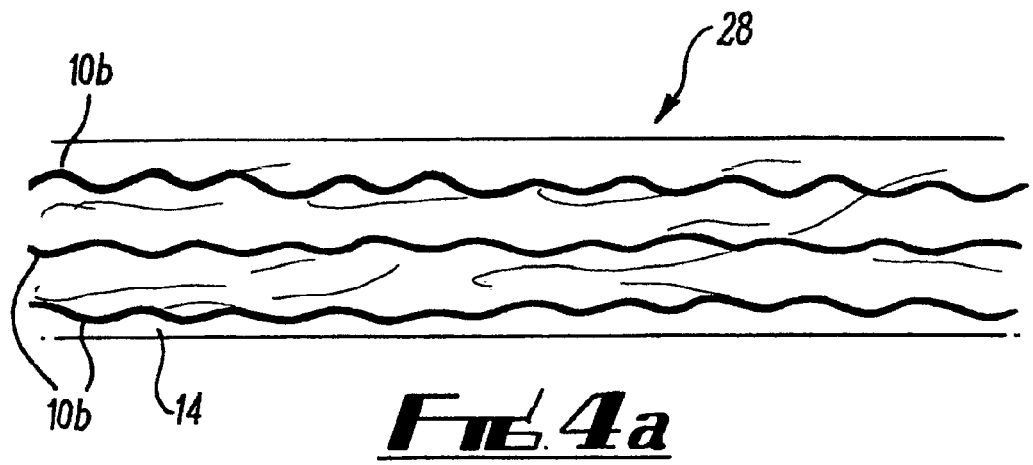
FIG. 4a is a diagrammatic lengthwise cross-section of a composite material comprising a curable thermoset resin fibre component and reinforcing fibre component according to a still further embodiment of the present invention.

FIG. 4a shows a composite material 28 according to a still further embodiment of the present invention wherein the thermoset fibre components 10b are all threaded within and along the length of the reinforcing fibre layer 14. The thermoset fibre components 10b may be the same or some or all of them may differ in the formulation.

It will be appreciated that the thermoset resin fibre components can be commingled with the reinforcing fibre component using any suitable techniques including threading, weaving, stitching and the like.

It is also within the scope of the present invention for the resin fibres 10 to be located at one or more surfaces of the fibrous layer 14, either placed thereon or shallowly woven into the surface. However such configurations do not generally enjoy all the advantages described above particularly those commingled through the thickness of the fibre layer 14 and are not illustrated.

Figure 4B:
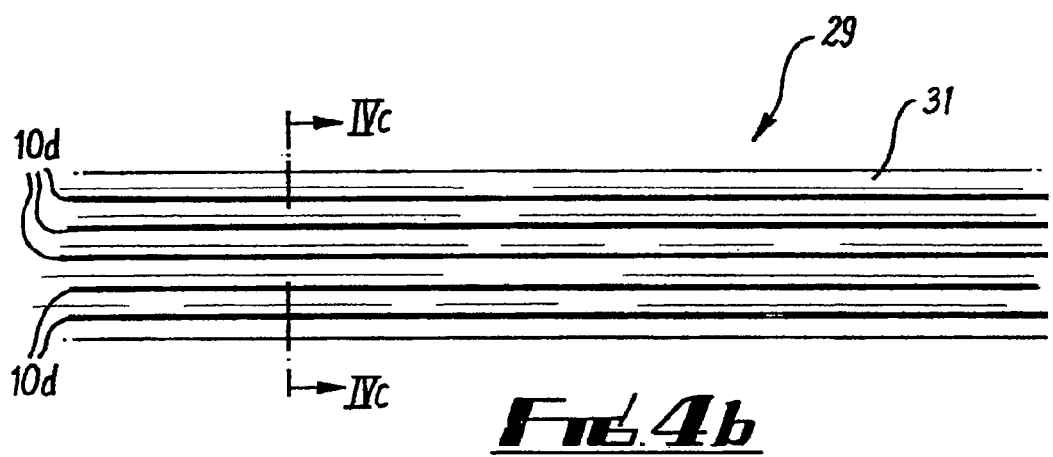
FIG. 4b is a diagrammatic lengthwise cross-section of further a composite material according to the present invention.
Figure 4C:
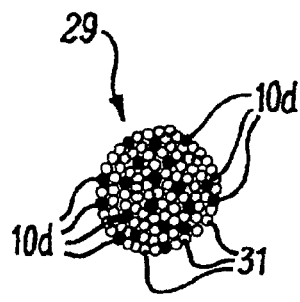
FIG. 4c is a diagrammatic width-wise cross-section of one embodiment of the composite material of FIG. 4b.
Figure 4D:
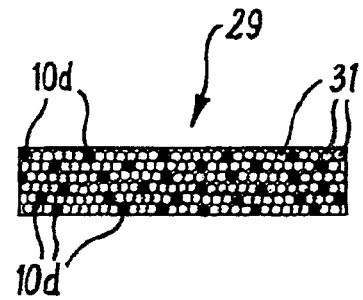
FIG. 4d is a diagrammatic width-Wise cross-section of another embodiment of the composite material of FIG. 4b.

FIG. 4b shows a composite material 29 comprising unidirectional reinforcing fibre component 31 through which extend lengthwise generally unidirectional thermoset resin components 10d. FIG. 4c is a cross-section of the material 29, showing the generally uniform distribution of the thermoset resin fibre components 10d throughout the material 29. FIG. 4d shows an alternative configuration in which the material 29 is generally in the form of a layer with the thermoset 10d and reinforcing of the components 31 generally evenly distributed therein.

Figure 5A:
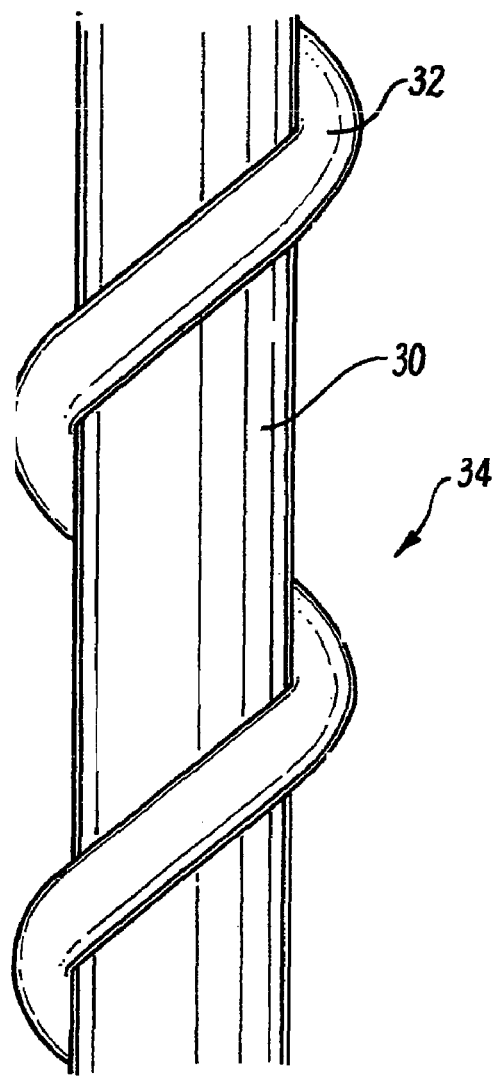
FIG. 5a is a diagrammatic representation of a composite material comprising a curable thermoset resin fibre component and a further fibre component.

FIG. 5a is a diagrammatic representation of a composite material 34 comprising a curable thermoset resin fibre component 30 around which is wound in a general helix configuration non-reinforcing fibre component 32, which in one embodiment comprises thermoplastic. Thermoplastic polymers are known to improve the toughness characteristics of thermoset resins, and the provision of a composite material 34 comprising commingled fibres of thermoset and thermoplastic provides a stable material that can then be used either to produce toughened fibre-reinforced composite articles or non-fibre reinforced composite materials and articles, such as adhesives.

The materials 34, which have a general fibre or thread-like conformation, can also be woven, threaded, stitched or otherwise commingled with fibre reinforcement, in particular layers of fibrous material, in a generally similar fashion as described in the embodiments above.

The advantage of the thermoplastic fibre component 32 being wound around the thermoset fibre component 30 is that it provides uniform distribution of the thermoplastic relative to the thermoset and thus for uniform toughness characterstics.

The thermoplastic fibre component 32 can comprise any one or a number of thermoplastic polymers, known in the art and formable into a fibrous conformation. Examples of such polymers include polyethylene, polypropylene, polyamide, polyether-ether-ketone, polyethylene terephthalate, polyethersulphone, polyetherimide, polyarylsulphone, polyphenylenesulphide, polyimide, polysiloxane and various other types of rubbers. It is generally preferred that the thermoplastic fibres are semi-crystalline.

The thermoplastic fibre components of the present invention may comprise one or more fibres of thermoplastic.

The ratio of thermoset resin fibre component to thermoplastic fibre component can be varied and determined according to the desired characteristics of the composite material and ultimately the composite, article manufactured therefrom.

For most applications the ratio of thermoset resin fibre to thermoplastic fibre will be in the range 90/10 to 70/30 and most preferably about 80/20, v/v.

Figure 5B:
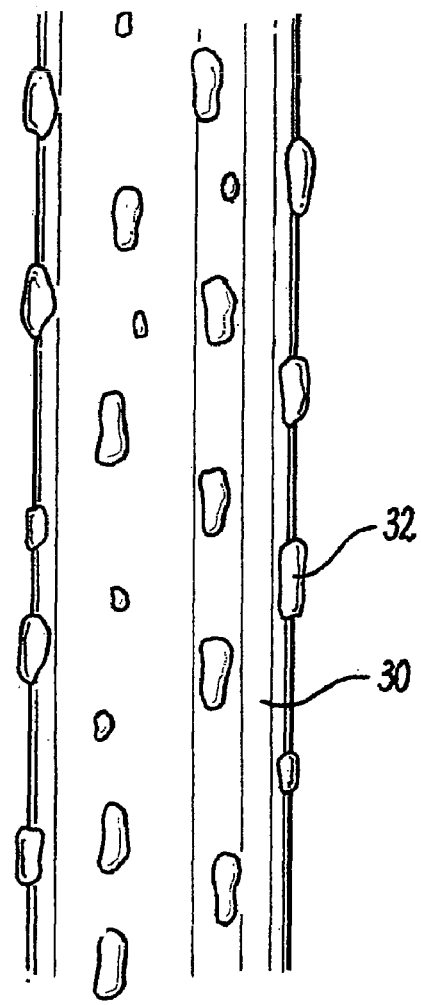
FIG. 5b is a diagrammatical representation of a further composite material comprising a thermoset resin fibre component and a further fibre component.

The thermoplastic component 32 may be spattered onto the thermoset resin fibre component 30 as showing in FIG. 5b.

Figure 6:
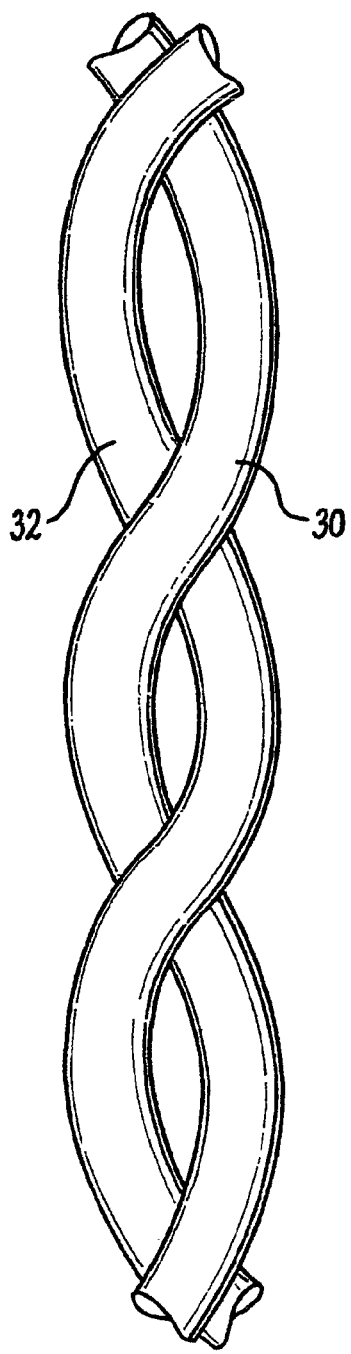
FIG. 6 is a further embodiment of a composite material comprising a curable thermoset resin fibre component and a thermoplastic fibre component, according to the present invention.

It is also within the scope of the present invention for the thermoset fibre component to be wound around the thermoplastic component, and for the thermoset and thermoplastics to be mutually intertwined as shown generally in FIG. 6.

Although not illustrated, it is also within the scope of the present invention for the thermoset or the thermoplastic fibre component to be wound around a reinforcing fibre component of which the representation would be similar to that of FIGS. 5a and 6, with numeral 30 representing the reinforcing fibre component and 32 the thermoplastic or thermoset resin component.

Winding of thermoset resin fibres around a thread or yarn of reinforcing fibre finds particular application in stretch-broken reinforcement fibres which essentially comprise carbon fibres, purposely stretched to a point where they are broken along their length. This provides particular drape and conformability advantages, but does inherently weaken the structure of the carbon fibre material. Wrapping fibres of thermoset resin of the present invention around the stretched broken reinforcement has been found to stabilise and strengthen the stretched broken yarn.

In an alternative embodiment, the non-reinforcing fibre component 32 comprises a cure agent.

The cure agent may be provided in sufficient amount to fully cure the thermoset resin component 30 when the material is subjected to cure conditions, or may comprise a part of the cure agent required.

However, it is preferable that the cure agent has no or only limited curative interaction with the thermoset resin. This can be achieved through the limited physical contact between the two generally solid fibre components and/or the cure agent being temperature sensitive and not exhibiting any appreciable curative properties beneath certain temperatures, below which the material would generally be stored.

It is also within the scope of the present invention that the non-reinforcing component 32 may be a blend of cure agent (s), thermoplastic(s) and other additives.

The present invention also provides composite materials comprising a thermoset resin fibre component, a non-reinforcing fibre component and a reinforcing fibre component.

Figure 7:
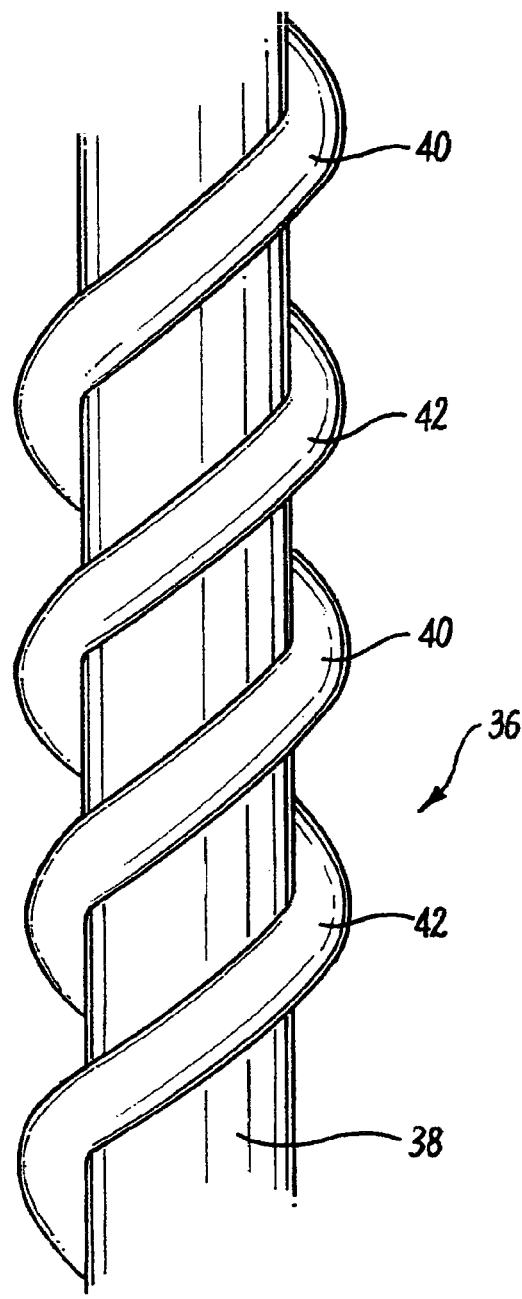
FIG. 7 is a diagrammatic representation of a composite material comprising a thermoset resin fibre component, thermoplastic fibre component and reinforcing fibre component in accordance with an embodiment of the present invention.

FIG. 7 is a diagrammatic representation of a composite material 36 comprising a central reinforcing fibre component 38 around which is wrapped a thermoset fibre component 40 and in spaced relation thereto a further non-reinforcing fibre component 42 to form a double-helix-type arrangement. Such a configuration provides a stable composite material, that can then be used to form composite articles and components. The material 36 provides a generally uniform distribution of both thermoset resin component and the further non-reinforcing fibre component around and along the length of the reinforcing fibre component 38.

In alternative configurations the central component 38 could be the thermoset or further non-reinforcing fibre component with the other thereof and the reinforcing fibre component wrapped therearound in the general double-helix configuration. The further non-reinforcing fibre component may be as described above, or may comprise a second thermoset fibre component which may be the same as or different to the other thermoset fibre component comprised in the method 36.

The double-helix configuration may be a generally equispaced configuration or the fibre components thereof could run in a closer and more stretched configuration or any other suitable configuration where the components preferably twist or wind relative to and around each other.

Figure 13:
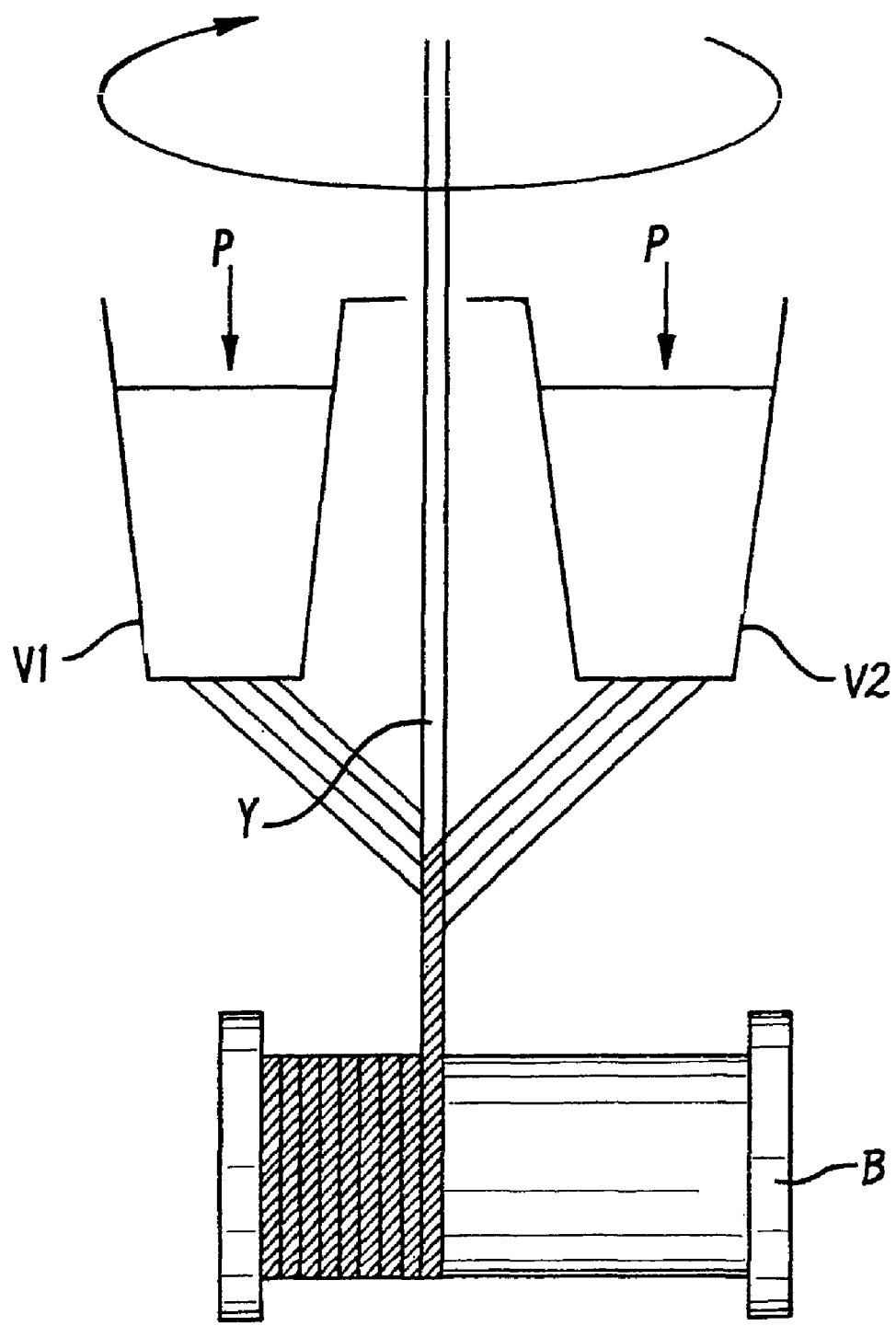
FIG. 13 is a diagrammatic illustration of a method of manufacture of composite material of the present invention.

FIG. 13 is a diagrammatic illustration of apparatus and a method of producing a composite material as described in relation to FIG. 7.

Two separate vessels or chambers within a single vessel V1, V2 are charged with liquid resin. For example V1 ban be charged with a thermoset resin formulation and vessel V2 can be charged with a further (which could be the same or a different composition) thermoset resin or possibly thermoplastic, curative or combinations of these. The vessels V1 and V2 may be heated. Pressure is applied generally in the direction of the arrows P. In or toward the base of the vessels V1 and V2 are apertures which may be in the form of holes or slits (not shown) though which the liquid material is forced. Between the vessels V1 and V2 extends centrally a fibre or yarn of reinforcing fibre Y, which extends from a source of that material (not shown) to a take up wheel or bobbin B. The vessels V1 and V2 rotate around the reinforcing fibre resulting in the threads of resin emerging from the respective vessels V1 and V2 being wound around the yarn Y. The relative speed of rotation of the vessels V1 and V2 and the speed of take up of the fibre Y on the bobbin B are coordinated so that the configuration of the resin threads on the central yarn are as required.

Figure 8:
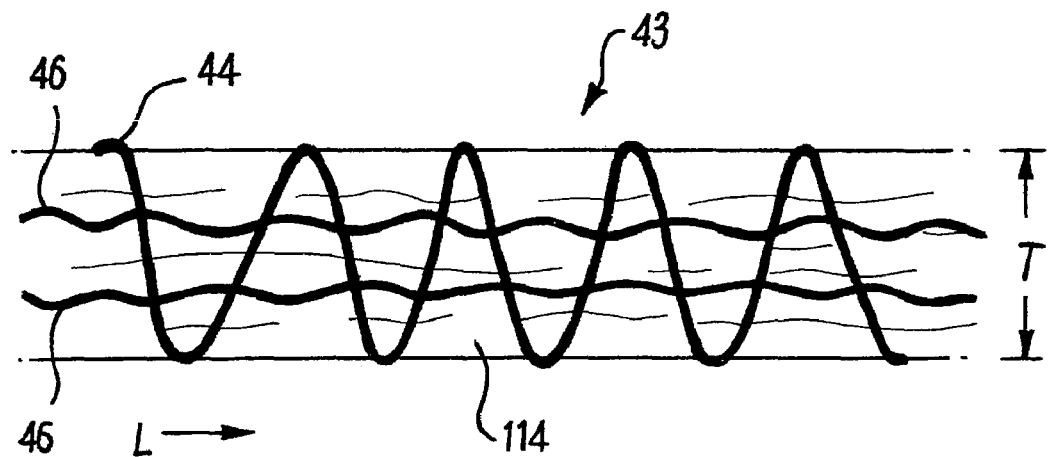
FIG. 8 is a diagrammatic lengthwise cross-section of a composite material comprising a thermoset resin fibre component, thermoplastic fibre component and a reinforcing fibre component according to a further embodiment of the present invention.

FIG. 8 illustrates a further embodiment of a composite material 43 comprising thermoset, thermoplastic and reinforcing fibre components. The composite material 43 comprises a layer of fibrous material 114 generally as described above. A thread of thermoset component 44 is woven or stitched through the thickness T and along the length of the fibrous layer 114 (in direction of arrow L) and thermoplastic fibre components 46 are threaded within the layer. It will be appreciated that the thermoset fibres 44 and thermoplastic fibres 46 can be interchanged.

Figure 9:
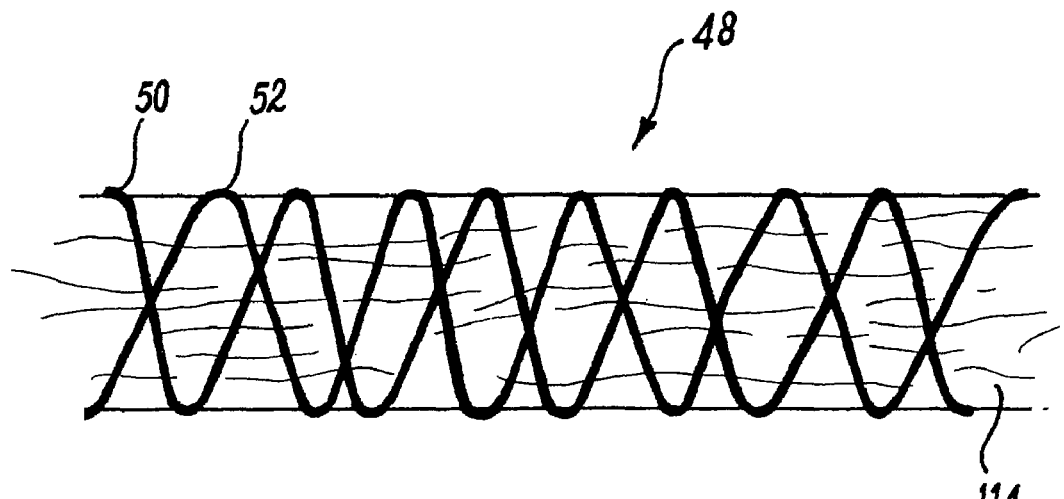
FIG. 9 is a diagrammatic cross-section of a composite material comprising a thermoset resin fibre component, thermoplastic fibre component and a reinforcing fibre component according to a still further embodiment of the present invention.

FIG. 9 shows a further composite material 48 wherein both the thermoset 50 and the thermoplastic 52 are woven or threaded or stitched through the thickness of the fibre layer 114, desirably in generally evenly spaced configurations.

In all of these configuration the air evacuation properties are good and it is shown that during cure the thermoset and thermoplastic uniformly mix within and throughout the fibrous layer 114 to provide an essentially void-free, homogenous and uniformly toughened cured composite article.

FIG. 10 is the diagrammatic cross-section of a composite material 54 comprising a reinforcing fibre component 214 through which is threaded a thermoset resin component 210 and on one side of the material 54 is a layer 56 of additional material, which may comprise a layer of resin either tacked onto the surface of the reinforcing fibre component 214 or partially impregnated therein.

The layer 36 may be of any material and may for example comprise further resin required to complete "wet-out" of the reinforcing fibre component 214 during cure. This additional resin will only generally be required where the amount of thermoset resin provided by the thermoset resin fibre component 210 is insufficient to fully wet-out the reinforcing fibre component 54.

FIG. 11 is an alternative embodiment showing material 58 comprising a reinforcing fibre component 314 through which is stitched in a generally castellated configuration, thermoset resin fibre component 310. On one side of the material 58 is a further layer of fibre reinforced material 60, which may comprise dry fibre or may comprise partially or fully impregnated fibre reinforced prepreg.

FIG. 12 shows a still further embodiment comprising composite material 62 having a reinforcing fibre component 414 through which is threaded a plurality of thermoset resin fibre components 410, generally in a similar fashion to the embodiment of FIG. 4a.

On one surface of the reinforcing fibre component 414 are blobs or other more uniform patterns of resin 64. These can be provided to supplement the thermoset resin from the thermoset resin fibre components 410 to ensure appropriate impregnation and wet-out of thermoset resin throughout the reinforced fibre component 414 during cure. The resin blobs or patterns 64 (in similar fashion to the layer 56 of the embodiment of FIG. 10) also provides surface tack to the otherwise generally dry composite material thus facilitating placement of the composite materials for or during cure.

All of the composite materials discussed above, can be manufactured to be devoid of any cure agent or of sufficient cure agent, in which case the cure agent required to facilitate cure of the thermoset resin fibre components is kept away from the material until such time as cure is to take place. As described above, the cure agents typically comprise catalyst and hardeners and are introduced to the composite material in light liquid form in a mould or on a tool surface following "lay up" or during the lay up process by techniques akin to resin infusion and others known to those skilled in the art.

Due to the very low viscosity of the cure agents, they could also be applied by other techniques such as spraying, or even painting, but particularly in relation to the latter where vacuum conditions are not applied, it would be preferable to apply the cure between alternate composite materials of a stack.

It is also within the scope of the present invention for some or all of the cure agent to be provided as part of the composite materials, as has been described above. For these embodiments the cure agent would be either solid or otherwise of high viscosity to avoid or hinder migration thereof within the material under storage conditions, and/or they may be temperature sensitive or otherwise present in a relatively deactivated state in the composite material.

In one embodiment, the cure agent could be in the form of a fibre component or particulate and present within a composite material described above, but spaced from the thermoset fibre component to avoid unwanted premature interaction and cure. For example, if the cure agent is in the form of a fibre, it could comprise one of the fibre components 40, 42 of the embodiment in FIG. 7, with the other of the components being the thermoset resin component spaced therefrom. Upon the application of non-storage, cure or pre-cure conditions the thermoset and cure agent fibre components would melt and merge to react to bring about cure. The reinforcing fibre component could act to space the thermoset resin fibre component from the cure agent in the material.

Figure 14:
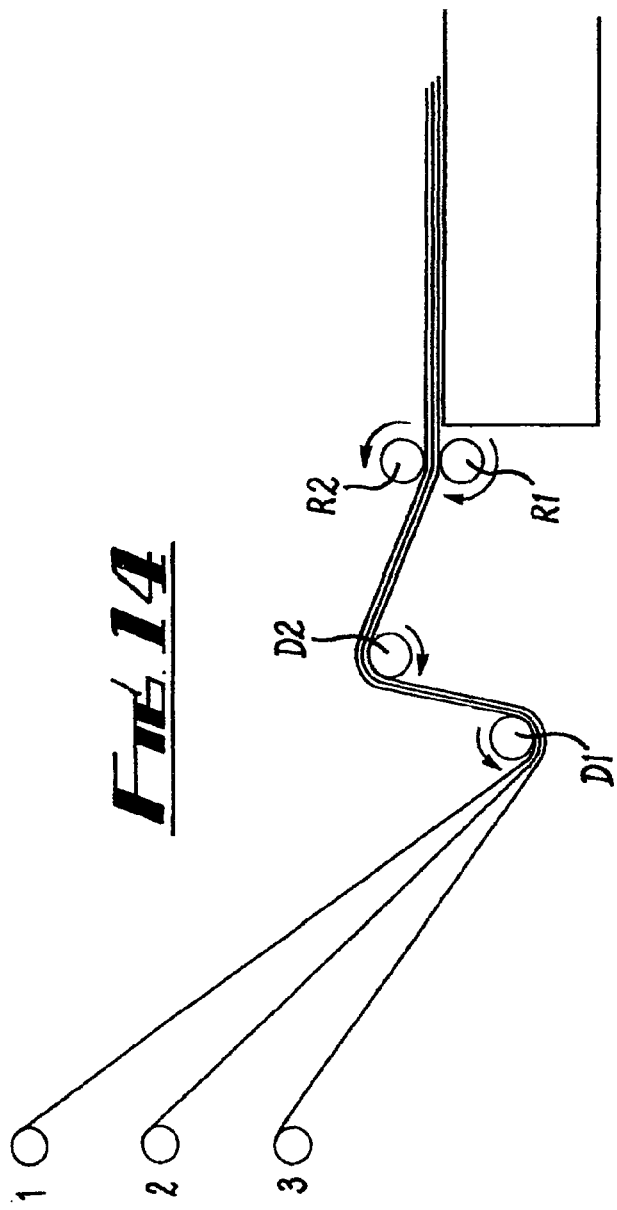
FIG. 14 is a diagrammatic illustration of an alternative method of manufacture of composite material in accordance with the present invention.

FIG. 14 is a diagrammatic illustration of further apparatus suitable for forming composite materials, according to the present invention. The apparatus is very similar to apparatus known in the formation of conventional prepregs. The advance is that the fibres being introduced into the composite material include thermoset resin fibre which is previously not know.

In FIG. 14, three sources as of fibre 1, 2, 3 are shown from each of which is provided fibrous materials for use in the formation of composite materials according to the present invention.

For example, source 1 may comprise a source of thermoset resin fibre components according to the present invention. Sources 2 and 3 may also comprise reinforcing fibre component, other non-reinforcing fibre components, further thermoset resin fibre components, or other various combinations.

Essentially the fibre components from the respective sources 1, 2, 3 are fed around the drums D1, D2 and through the rollers R1, R2 to be packed together to form composite material which is then further processed accordingly to conventional techniques such as the application of further layers of resin, supporting substrates and so on.

The apparatus of FIG. 14 is suitable for example to form composite materials described in relation to FIG. 4a, 4b, 4c, 4d, FIG. 12. Further processing of the composite material produced by the apparatus 14 could include stitching to produce composite material as shown for example in FIG. 3 and FIG. 8.

Figure 16:
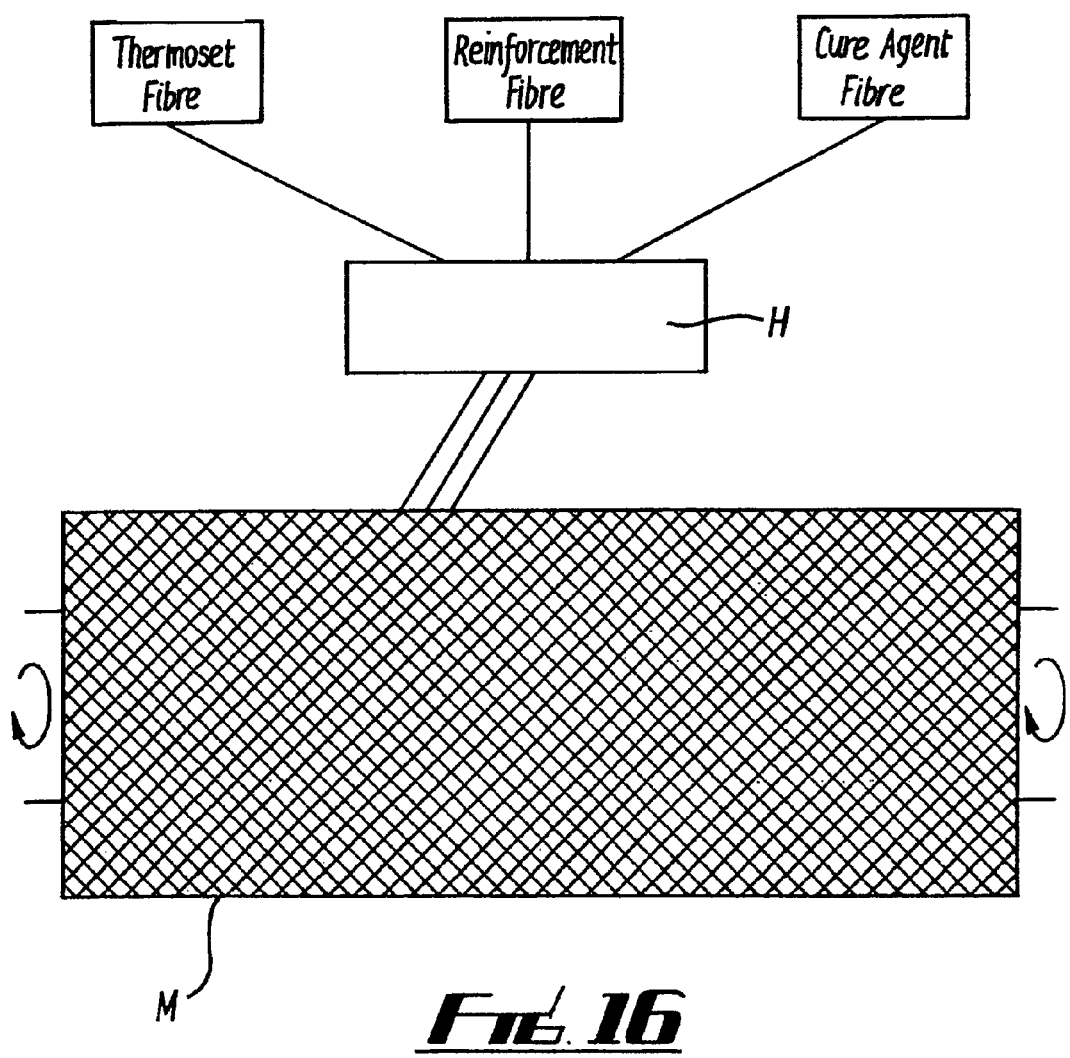
FIG. 16 is a diagrammatic representation of the present invention being used in tow placement.

The materials of the present invention can also be used in tow placement methodologies. FIG. 16 is a diagrammatic illustration of the use of thermoset fibre components of the present invention used in tow placement.

The apparatus generally conventional apparatus for tow placement. However, thermoset fibre is fed to the placement head H along with reinforcement fibre and cure agent fibre (or more thermoset or any other fibres). The three fibre components fed to the head H are then located onto and wound around a mandrel M which is rotated about its axis to effect winding. The head H moves up and down the length of the mandrel M to ensure even winding of the fibres.

It will be appreciated that the number and nature of fibres fed to the head can be varied according to the nature and the number of fibres to be wound on the mandrel M. For example, more than one thermoset fibre component may be fed to the head H. This plurality of thermoset fibre components may be the same or different to one another. The number and nature of reinforcement fibres may be varied. Cure agent may not be provided in fibre form and may be applied in other ways, for example, the cure agent may be provided within the reinforcement fibre component and/or the thermoset fibre component as discussed above. Further non-reinforcing fibre components may be used.

It will be, apparent to those skilled in the art as to the considerable number of options and variations that can be employed using tow placement technology and the advantages of using thermoset resin fibre components in such technology, in accordance with the present invention.

Various modifications may be made without departing from the spirit or scope of the present invention.

It will be appreciated that in the above referenced embodiments the number of thermoset and non-reinforcing fibre components illustrated are particularly small. Whilst it is within the scope of the present invention for components comprising single fibres and single fibre components to be used, it will be more usually for many, perhaps hundreds or even thousands of fibre components to be provided in a composite material of the present invention.

It will be further appreciated that there are very many configurations of composite materials that can be produced using thermoset resin fibre components of the present invention and that the above embodiments are only a selection chosen to illustrate the significant advantages and wide range of applications and configurations of materials that can be produced in accordance with the present invention.

For many applications of the present invention the general preference is to provide composite materials throughout or generally throughout which there is an even distribution of all thermoset fibre component to provide for the manufacture of composite articles therefrom that exhibit uniform properties throughout their structure.

However, for certain applications the distribution of the different fibre components can be intentionally non-uniform and selective to form material with non-uniform distribution of components therewithin and thus enable articles to be produced with areas or regions thereof with specifically engineered properties that differ from other areas or regions thereof. The fibrous nature of the components and particularly the thermoset resin components of the present invention facilitate the production of such materials and articles.

For example, where thermoset and/or non-reinforcing components have been described and illustrated above with reference to the Figures, as extending through the thickness T and along the length L, they could be provided to extend along only part of the length, a number of sections of the length, only partway through the thickness and so on. Also of course, such materials also generally have a width, often being generally in the form of a layer or sheet, and the components could be provided at only predetermined locations or areas across that width.

The fibrous form of the components provides for the components to be easily provided in such a selective manner. They can for example be simply stitched into reinforcing fibre at predetermined locations and/or woven or otherwise threaded into the matrix of the reinforcing fibre. Further, the components illustrated particularly with reference to FIGS. 5 and 7 could be provided at predetermined and spaced regions along the length of the central component.

Composite materials according to the present also find application as adhesives and other non-fibre-reinforced materials. Embodiments described hereinbefore, particularly those absent any reinforcing fibre component can find such application.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A composite material in the form of a thread or yarn comprising a curable thermoset resin fibre component commingled with a reinforcing fibre component.

2. A composite material according to claim 1, in which the outside diameters of fibres in the respective fibre components are substantially the same.

3. A composite material according to claim 1, in which the reinforcing fibre component comprises at least one of carbon, glass, aramid and ceramic.

4. A composite material according to claim 1, in which the ratio of thermoset resin fibre component to reinforcing resin fibre component is in the range 50:50 to 10:90 v/v.

5. A composite material according to claim 1, further comprising a cure agent initially located away from contact with the thermoset resin fibre component.

6. A composite material according to claim 1, in which at least some reinforcing fibres in the reinforcing fibre component are woven, stitched, continuous, discontinuous, unidirectionally oriented, randomly orientated, chopped, twisted or intertwined.

7. A composite material according to claim 1, in which the thermoset resin fibre component and the reinforcing fibre component are commingled by being woven, stitched, twisted or intertwined together.

8. A composite material according to claim 1, in which at least one thermoset resin fibre in the thermoset resin fibre component is twisted around and along the length of at least one reinforcing fibre in the reinforcing fibre component.

9. A composite material according to claim 1, in which at least one reinforcing fibre in the reinforcing fibre component is twisted around and along the length of at least one thermoset resin fibre in the thermoset resin fibre component.

10. A composite material according to claim 1, in which the thermoset resin fibre component and the reinforcing fibre component run alongside each other in generally parallel configuration.

11. A composite material according to claim 1, further comprising a layer of thermoset resin fibres and a layer of reinforcing fibres in contact with one another along at least one respective surface.

12. A composite material according to claim 11, in which each layer of fibres is woven, stitched, continuous, discontinuous, unidirectional or randomly configured.

13. A composite material according to claim 1, in which the thermoset resin component is woven, stitched, or otherwise threaded into the reinforcing fibre component, to be generally evenly distributed.

14. A composite material according to claim 1, in which the thermoset resin component is woven, stitched or otherwise threaded into the reinforcing fibre component at one or more predetermined and selected regions of the reinforcing fibre component.

15. A composite material according to claim 1, in which the reinforcing fibre component is woven, stitched or otherwise threaded into the thermoset resin fibre component, to be generally evenly distributed within the thermoset resin fibre component.

16. A composite material according to claim 1, in which the reinforcing fibre component is woven, stitched or otherwise threaded into the thermoset resin component at one or more predetermined and selected regions within the thermoset resin fibre component.

17. A composite material according to claim 1, in which the thermoset resin fibre component comprises a plurality of thermoset resin fibres.

18. A composite material according to claim 17, in which the fibres in the thermoset resin fibre component are unidirectional.

19. A composite material according to claim 17, in which the fibres in the thermoset resin fibre component are intertwined.

20. A composite material according to claim 17, in which the fibres in the thermoset resin fibre component comprise a blend of a number of thermoset resins.

21. A composite material according to claim 1, in which fibres within the thermoset resin fibre component are continuous.

22. A composite material according to claim 1, in which fibres within the thermoset resin fibre component are discontinuous.

23. A composite material according to claim 1, in which the thermoset resin fibre component comprises at least one of an epoxy resin, cyanate ester resin, BMI (bismaleimide), polybenzoxazine, polyimide, phenolic resin and polyester.

24. A composite material according to claim 1, in which the thermoset resin fibre component comprises a plurality of different fibres comprising different thermoset resins or blends thereof.

25. A composite material according to claim 1, in which the thermoset resin fibre component comprises at least one thermoplastic that acts to toughen the thermoset fibre component.

26. A composite material according to claim 1, in which the thermoset resin fibre component comprises little or no cure agent.

27. A composite material according to claim 1, in which the thermoset fibre component comprises cure agent, which is inhibited when the thermoset resin fibre component is stored under refrigerated or frozen conditions.

28. A composite material according to claim 1, in which the thermoset resin fibre component has a viscosity greater than $5 \times 10^4$ Pas at a temperature of 23° C.

29. A composite material according to claim 1, in which the thermoset resin fibre component has a viscosity greater than $2 \times 10^5$ Pas at a temperature of 23° C.

30. A composite material according to claim 1, in which the thermoset resin fibre component has a diameter of between 3 and 50 microns.

31. A composite material according to claim 1, in which the thermoset resin fibre component has a diameter of between 5 and 10 microns.

32. A composite material according to claim 1, in which the curable thermoset resin fibre component comprises N,N,N,N-tetraglycidil-4'4-diaminodiphenylmethane and polyethersulphone.

33. A method of manufacturing a composite article comprising subjecting the composite material according to claim 1 to cure conditions.

34. A method according to claim 33, in which the thermoset resin fibre component or composite material is combined with cure agent at or shortly before commencement of the cure process.

35. A method according to claim 33, in which cure agent may be comprised within the composite material and the cure action thereof promoted by the application of the cure conditions.

36. A composite article manufactured by subjecting the composite material according to claim 1 to conditions to cure the composite material.

* * * * *